United States Patent
Beck et al.

(10) Patent No.: US 10,504,048 B2
(45) Date of Patent: Dec. 10, 2019

(54) SYSTEMS AND METHODS FOR ENTERPRISE CONTENT CURATION

(71) Applicant: Folloze, Inc., Palo Alto, CA (US)

(72) Inventors: Etai Beck, Palo Alto, CA (US); David Brutman, Palo Alto, CA (US); Zvika Menachemi, Palo Alto, CA (US)

(73) Assignee: Folloze, Inc., Palo Alto, CA (US)

( * ) Notice: Subject to any disclaimer, the term of this patent is extended or adjusted under 35 U.S.C. 154(b) by 799 days.

(21) Appl. No.: 14/312,301

(22) Filed: Jun. 23, 2014

(65) Prior Publication Data
US 2015/0006237 A1    Jan. 1, 2015

Related U.S. Application Data

(60) Provisional application No. 61/840,455, filed on Jun. 27, 2013.

(51) Int. Cl.
*G06Q 10/00* (2012.01)
*G06Q 10/06* (2012.01)

(52) U.S. Cl.
CPC .................. *G06Q 10/0633* (2013.01)

(58) Field of Classification Search
CPC ........... G06Q 10/0633; G06Q 10/0635; G06Q 10/067
USPC ........................................................ 705/7.27
IPC ........................................................ G06Q 10/06
See application file for complete search history.

(56) References Cited

U.S. PATENT DOCUMENTS

| | | | | |
|---|---|---|---|---|
| 6,411,993 B1* | 6/2002 | Reynolds | ............... | G06F 17/24 707/999.01 |
| 8,150,842 B2* | 4/2012 | Brougher | ............ | G06Q 10/063 707/723 |
| 8,706,546 B2* | 4/2014 | Anderson | ............. | G06Q 30/02 705/14.23 |
| 2002/0019743 A1* | 2/2002 | Nakamura | ........... | G06Q 20/102 705/40 |
| 2004/0122835 A1* | 6/2004 | McKibben | ............ | G06Q 10/10 |
| 2005/0075886 A1* | 4/2005 | LeFebvre | ............ | H04M 3/4938 704/276 |
| 2006/0075019 A1* | 4/2006 | Donovan | .......... | G06F 17/30867 709/203 |
| 2006/0095331 A1* | 5/2006 | O'Malley | ......... | G06F 17/30902 705/22 |
| 2006/0242154 A1* | 10/2006 | Rawat | ............... | G06F 17/30126 |

(Continued)

OTHER PUBLICATIONS

Gruber, T., "Toward Principles for the Design of Ontologies Used for Knowledge Sharing," In International Journal Human-Computer Studies 43, p. 907-928, substantial revision of paper presented at the International Workshop on Formal Ontology, (Year: 1993).*

(Continued)

*Primary Examiner* — Hafiz A Kassim
(74) *Attorney, Agent, or Firm* — Perkins Coie LLP

(57) ABSTRACT

Some embodiments include a method of operating an enterprise content curation system. For example, the method can include recording an association between a content item with a first contributor account in response to receiving a first content contribution activity; receiving a command to share the content item with a second contributor account; recording a second content contribution activity associated with the second contributor account; and computing an impact score for the first contributor account based on the second content contribution activity.

14 Claims, 15 Drawing Sheets

(56) References Cited

U.S. PATENT DOCUMENTS

| | | | | |
|---|---|---|---|---|
| 2007/0078675 A1* | 4/2007 | Kaplan | G06Q 10/10 | 705/26.1 |
| 2007/0100898 A1* | 5/2007 | Petras | G06F 17/30699 | |
| 2009/0234689 A1* | 9/2009 | Simon | G06Q 10/00 | 708/505 |
| 2009/0265430 A1 | 10/2009 | Bechtel et al. | | |
| 2010/0042928 A1* | 2/2010 | Rinearson | G06F 15/177 | 715/737 |
| 2012/0005209 A1* | 1/2012 | Rinearson | G06F 17/30908 | 707/737 |
| 2012/0265755 A1* | 10/2012 | McNally | G06Q 10/063 | 707/723 |
| 2013/0061154 A1* | 3/2013 | Bennett | G06Q 10/10 | 715/753 |
| 2013/0151948 A1 | 6/2013 | Khalil et al. | | |
| 2013/0204658 A1* | 8/2013 | Yogev | G06Q 30/0201 | 705/7.29 |
| 2013/0298006 A1* | 11/2013 | Good | G06Q 10/107 | 715/234 |
| 2013/0325609 A1* | 12/2013 | Sokolov | G06F 17/30174 | 705/14.54 |
| 2015/0026260 A1* | 1/2015 | Worthley | G06Q 10/10 | 709/204 |

OTHER PUBLICATIONS

Gruber, T., "Collective Knowledge Systems: Where the Social Web meets the Semantic Web," Web Semantics: Science, Services and Agents on the World Wide Web (2007), doi:10.1016/j.websem.2007.11.011, (Year: 2007).*

International Search Report and Written Opinion dated Dec. 18, 2014, for International Application No. PCT/2014/043687, International Filing Date Jun. 23, 2014, 6 pp.

* cited by examiner

FIG. 6

Check out "Qlik for ModoMind Marketing" by Laurie

Laurie Anderson <info@folloze.com>
Reply-To: laurie@equitier.com
To: John.Stockton@modomind.com Sat, May 17, 2014 at 9:04 AM You've been invited by Laurie from equitier.com Laurie Hi John.Stockton@modomind.com,
I've put together a number of resources I think you will find interesting. I look forward to hearing back!

JUNIPER NETWORKS

View Content →

QlikView

QlikView for ModoMind Marketing

Get insight on your marketing activities – measure and improve 6 items

FIG. 10

SYSTEMS AND METHODS FOR ENTERPRISE CONTENT CURATION

CROSS-REFERENCE TO RELATED APPLICATION(S)

This application claims the benefit of U.S. Provisional Patent Application Ser. No. 61/840,455, entitled "SYSTEMS AND METHODS FOR ENTERPRISE CONTENT CURATION," which was filed on Jun. 27, 2013, which is incorporated by reference herein in its entirety.

RELATED FIELDS

This disclosure relates generally to an enterprise workflow system and, in particular, to providing an enterprise workspace content management system.

BACKGROUND

Internal institutional content is commonly handled by knowledge management (KM) systems and content management (CM) systems. Enterprise content affiliated with external customers is commonly managed by customer relationship management (CRM) systems. These systems, in departments within an enterprise, are often incompatible with one another and tend to operate independently from one another (e.g., maintaining separate repositories). Hence, content access tends to be compartmentalized.

Apart from the compartmentalization, these conventional systems only capture a small fraction of knowledge in the employees' heads and the local computers due to lack of incentives to participate in the above-mentioned systems. Particularly, most systems only provide tools to organize and search content within a repository, and lacks logic to implement any incentive structures.

In the enterprise environment today, a great majority of knowledge and content remain unshared and/or compartmentalized (e.g., as personal knowledge, locally stored content, or content limited within a particular department). For example, this valuable knowledge (often referred to as tribal knowledge) can include sales methods (e.g., implemented by a sales department), customer fixes (e.g., implemented by service departments), and creative marketing ideas (e.g., implemented by marketing departments).

DISCLOSURE OVERVIEW

The lack of knowledge sharing within an enterprise and between enterprises can immensely affect business operations. Disclosed is a content curation system that creates a system environment to capture enterprise knowledge, converting this knowledge into testable and gradable content. Content may refer to individual content items or a collection of content items, such as a "content board" or a "content package." For example, the content items can include standard operating procedures (SOPs), specifications, templates, sales methods, and other knowledge or content. The disclosed system environment provides a platform to improve, for example, sales team deal closure processes, marketing processes, customer service processes, legal document review processes, etc. These examples are all areas that traditionally suffer from a lack of systematic capturing of relevant enterprise knowledge and content.

The disclosed system advantageously encourages various stages of knowledge management, including content creation, content curation (e.g., promotion of relevant knowledge and removal or discouragement of irrelevant content), and content sharing. Content curation can include organizing, editing, commenting, rating, and recommending a content item or a content board. In some embodiments, sharing content and following content may also be considered implicit content curation activities. That is, sharing and following of content implies approval of the content (e.g., in terms of relevancy and/or quality). The disclosed system encourages the above activities by promoting content accountability. For example, content accountability is achieved by maintaining content-centric metadata and analytics in a content-centric social network. The content-centric social network incentivizes content sharing and curation by tracking the business impact of each content posting, sharing, and curation activities using the content-centric metadata associated with particular contributor accounts.

The disclosed content curation system democratizes knowledge and content within the often rigid compartments of an enterprise workspace. The disclosed system provides a platform to track information flow within the enterprise workspace and across enterprise workspaces. For example, this platform can track how content items and content boards are shared (e.g., active sharing by a content owner or passive sharing through content request or content subscription from a viewer), the channels of sharing, the rate of sharing, and how the content is evolving through each share. These analytics can rely on metadata related to content creation activities, content curation activities, and content sharing activities. The analytics serve as business impact estimators, enabling employees to satisfy a deep-rooted interest in self-reassurance and self-verification of business-related performance. The management and human resource department of a company may further use these analytics to award employees in terms of the knowledge-based network effects of the tracked activities in the company or across companies.

Every worker can be a content contributor in the sense of a content source, a curator, a follower, a viewer, or a combination thereof. The problem of the lack in systematic capture of relevant knowledge is solved by the content curation system through encouraging the building, curation, and sharing of collective wisdom. The content curation system is able to specifically encourage these contributions by targeting contributors based on an assessment that measures or estimates impacts of their contributions.

The disclosed content curation system also enables people to "follow" (i.e., to subscribe to a live or asynchronous feed of published content) the curated content and tap into the knowledge of their co-workers and business associates. This way, the barrier for sharing content is thus reduced by allowing subscription to content sources organized within a workspace. The content sources can be organized by specific organizations (e.g., departments or enterprises), by specific contributors (e.g., specific curators, specific content sources, specific sharing sources, and etc.), and/or specific content boards. Furthermore, incentives for sharing and following are built into the disclosed system. People who share content can build their internal reputations and follow the reputations built-up through the content-centric business performance analytics, as described above. For example, business performance analytics can include tracking views and reach of content (e.g., individual content items or content boards), copies made of content, expansion of contributors of different types, and etc. Followers can benefit from content richness, and also benefit from the wisdom of the crowd identifying and discovering relevant content through curation activities. The curated wisdom and knowledge bank may be used for cross boundary publishing, internal and external sharing, subscription, or any combination thereof.

The content curation system further enables a platform to identify relevant content items in a content board (e.g., through a content curation interface for each content board). This platform encourages multiple incoming sources of knowledge and content by allowing multiple contributor accounts to associate with the content board. Further, the content can be ported or linked from various existing content hosting systems, such as KM systems, CMSs, CRMs (e.g., SalesForce.com), and data storage systems (e.g., networked storage or cloud storage). For example, content can be ported or linked from Dropbox™ or Box™ and other web-based data storage systems. The disclosed system prevents an over-influx of irrelevant content by encouraging relevancy-based curation (e.g., recommending, rating, editing, commenting, etc.). The content curation system provides a single place to curate, access, and share content, and thus making curation part of the accessing/viewing of content. This enables users to uniformly curate and access content in parallel. In traditional systems, often times the effort of locating a relevant piece of content is wasted. In the content curation system disclosed, the locator of the relevant piece of content may curate that source of content as he/she is locating the content. In the disclosed paradigm, the content curation system creates a collective wisdom for business excellence, and transforms knowledge management from a submission-based model to a crowd-based model.

In various embodiments, contributors associated with a content item or content board has access to one or more business impact analytics computed by the content curation system. The content curation system can impose permission and confidentiality settings that limit which activities can be performed by each type of contributor. The permission and confidentiality setting can also limit which of the business impact analytics and/or metadata are visible to a contributor.

The disclosed system advantageously connects companies and/or individuals in companies through joined engagement with content items and boards. The disclosed system maps essential business relationships between companies in a content-centric social graph where relationships are defined by common interest in content between professionals. In this way, the disclosed system provides value in ways beyond mere curation of content by building engagement amongst professionals and companies.

The disclosed system also advantageously visualize the content-centric social graph to its users. For example, the disclosed system can automatically assign iconic or symbolic images (e.g., company logos, department logos, profile pictures, etc.) for the content and the users to create human associations with context. This way, the disclosed system leverages eye-sight to brain auto-correlated behaviors to promote users to quickly recognize, filter and select relevant content The disclosed system further advantageously enables automatic curation. Whereas manual curation happens when contributors reference content in various storage systems into a content board, automatic curation can occur when the system places content in various storage systems automatically onto the content board based on the business context associated with the content board or the user profiles of the contributors. For example, the disclosed system can determine that the business context is a customer deal, a competitive situation, a design process, a quality assurance process, etc. A contributor can identify the business context to the disclosed system. For example, a user profile can include existing content associated with a contributor, social connections of the contributor, professional position of the contributor at a company, the company the contributor works for, locations visited by the contributor while engaged with the content board (e.g., via a mobile device), etc.

Some embodiments of the disclosure have other aspects, elements, features, and steps in addition to or in place of what is described above. These potential additions and replacements are described throughout the rest of the specification

BRIEF DESCRIPTION OF THE DRAWINGS

FIG. 6 is an example of a content curation interface for a content board, in accordance with various embodiments.

FIG. 10 is an example of an email received by an invitee to participate in curating the new content board, in accordance with various embodiments.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
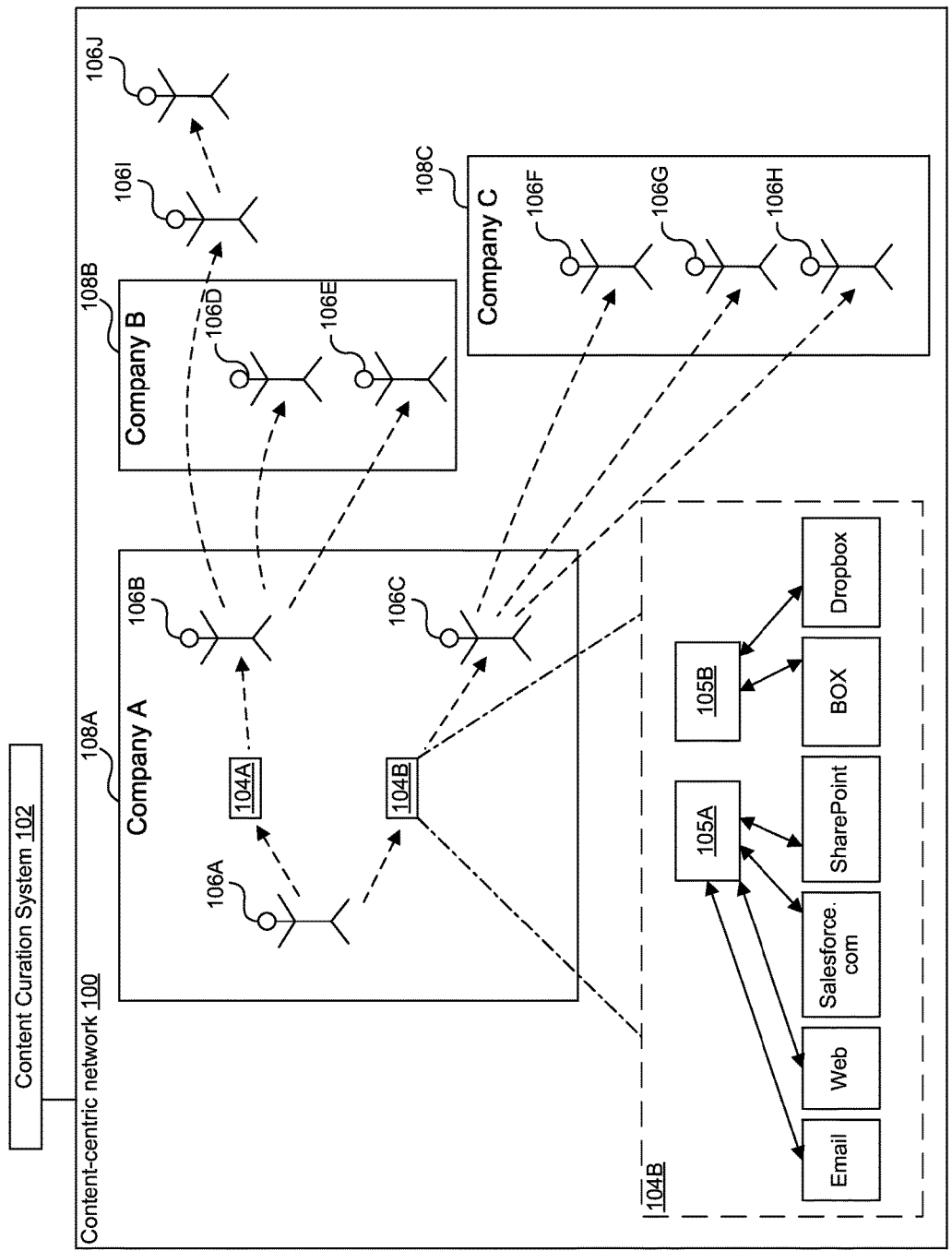
FIG. 1 is a data flow diagram of a content-centric network managed by a content curation system, in accordance with various embodiments.

FIG. 1 is a data flow diagram of a content-centric network 100 managed by a content curation system 102, in accordance with various embodiments. The content-centric network 100 comprises a mapping, which represents a data flow of one or more content boards (e.g., a first content board 104A, a second content item 104B, etc., collectively as the "content boards 104"). The content boards 104 can include one or more sets of content items (e.g., a first content item 105A, a second content item 105B, etc., collectively as the "content items 105") deemed to be associated with one another. For example, the content items 105 in the content board 104B can be populated by an original contributor (e.g., a first account 106A) and further curated and edited by contributors who associate with the content board 104B (e.g., voluntarily or through an invitation from the original contributor). The content boards can also be referred to as "content packages."

The content items 105 can be linked from other storage service systems into the content boards 104 via an interface in the content curation system 102. For example, the storage systems can include KM or CM systems, CRM systems, and other data storage systems (e.g., networked storage or cloud storage). For example, content can be ported or linked from Dropbox™, Box™, SalesForce.com™, SharePoint™, an email inbox, other websites, and other web-based data storage systems.

The data flow indicates how the content items 105 are shared amongst enterprise accounts (e.g., the first account 106A, a second account 106B, a third account 106C, and so forth till and including a tenth account 106J, collectively as the "enterprise accounts 106"). The enterprise accounts 106 are associated with user profiles in the content curation system 102. The enterprise accounts 106 can include contributors who form, create, share, organize, and/or manage one or more of the content items 105. The user profiles can be associated with viewers and curators of at least one of the content items 105. The user profiles can correspond to one or more of individuals and/or groups.

The enterprise accounts 106 are each associated with one or more organization labels (e.g., a first organization label 108A, a second organization label 108B, and a third organizational label 108C, collectively as the "organization labels 108"). The organization labels 108 can denote which company the enterprise accounts 106 belong in and, hence, what permission and confidentiality setting is applied thereto. That is, each company or department of a company may be associated with its own configurable permission and confidentiality setting.

The content-centric network 100 captures metadata on how the content items 105 are shared, including time and method of the sharing and the direction of the sharing. For example, the method of sharing can include sending a link of the first content item 104A from the first account 106A to the second account 106B, e.g., via a message through the content curation system 102 or an email. The method of sharing can also include the first account 106A requesting a new copy (i.e., instance) of the first content item 104A to be generated in the content-centric network 100 and sharing the new copy with the second account 106B. In some embodiments, the method of sharing may not include a subject. For example, one of the enterprise accounts 106 can follow (i.e., subscribe to) the first content board 104A. The content curation system 102 can then authenticate that enterprise account against the permission and confidentiality setting for the first content board 104A. If authentication succeeds, the content curation system 102 can then provide access to the first content board 104A.

Figure 2:
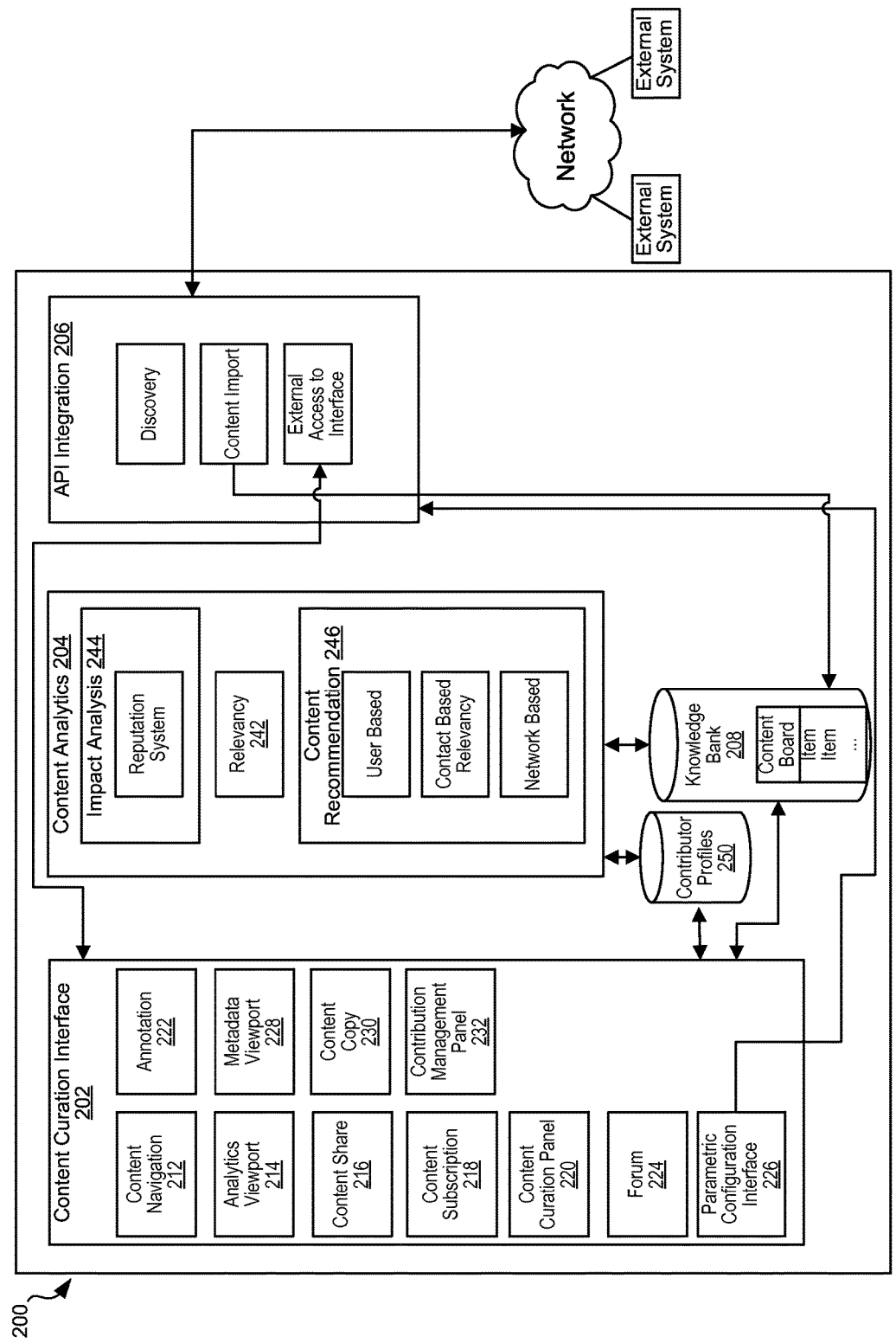
FIG. 2 is a block diagram of an example system architecture of a content curation system, in accordance with various embodiments.

FIG. 2 is a block diagram of an example system architecture of the content curation system 200 (e.g., the content curation system 102 of FIG. 1), in accordance with various embodiments. The content curation system 200 offers a method to curate content from multiple enterprise content sources, such as file stores, collaboration systems, business applications, social networks, email inboxes, shared drives, portals, wikis and more. The curated content can be in variety of formats: HTML page, MS-WORD document, MS-PowerPoint presentation, MS-Excel workbook, PDF file, image file, cloud-based application file format, web-based application file format. The curated content can further be a snippet derived from a result of a business query, communication between messaging applications, including email, or any combination thereof.

The content curation system 200 can include a content curation interface 202, a content analytics module 204, and an application programming interface (API) integration module 206. The content curation system 200 can further maintain a knowledge bank 208 and a contributor profiles store 210.

The content curation interface 202 is a set of modules that facilitate an interactive interface to help users of the content curation system 200 to curate content. The interactive interface can be presented on a mobile device or other computing device, through a browser or a stand-alone application. The content analytics module 204 contains logic to analyze behaviors and activities of the users of the content curation system 200. Such analysis further provides information to incentive the users to contribute to its content-centric community. The content analytics module 204 enables client-side content processing to analyze uploaded or referenced content curated into the knowledge bank 208 through the content curation interface 202. The content analytics module 204 can further extract metadata of the uploaded or referenced content to compute additional analytics.

The API integration module 206 provides the logic to interface with external systems, including external storage systems, social network systems, content analytic systems, etc. The API integration module 206 can retrieve and send content and other related data from and to the external systems. For example, the API integration module 206 can import contacts/user profiles that are associated with an event or group, and use the imported contacts to setup a content board. In some embodiments, the API integration module 206 can keep a live connection with at least one of the external systems to get real-time updates on content changes and other metadata changes relating to the content (e.g., change of content ownership or associated user profiles and timestamps of the content changes). Likewise, the API integration module 206 can also push real-time updates from the content curation system 200 back to the external system. For example, the content curation system 200 can update an external CRM system, such as SalesForce.com, with the latest content interaction activity on a content board associated with a customer profile managed by the external CRM system.

The knowledge bank 208 stores content items and content boards and/or links to content items and content boards. In some embodiments, the knowledge bank 208 can also store some or all of the content items and content boards (for later retrieving). In some embodiments, the whole or part of the knowledge bank 208 can be implemented on an external system (e.g., through the API integration module 206). The knowledge bank 208 further stores the associations between contributor accounts and content (e.g., content items and content boards). The contributor profiles store 210 stores the profiles of such contributor accounts. In various embodiments, the contributor profiles represent users of the content curation system 200. In some embodiments, a passive viewer of content can use the content curation system 200 without establishing a contributor profile in the contributor profiles store 210.

Structure of Content in the Content Curation System

Stored content or referenced content in the knowledge bank 208 can be organized as content items and content boards. A content item is an atomic content element (e.g., content that can be curated from a storage system). A content item can be represented by a data file. A content board is a collection of content items that is deemed to have some common context (e.g., either by a contributor account or automatically by the content curation system 200) and that the contributors have gathered to present jointly. The content items and content boards are each associated with at least one of the contributor profiles stored in the contributor profiles store 210. In some embodiments, a passive viewer (i.e., who is not contributing to curation of the content) of a content item or a content board is required to have a contributor profile in the contributor profiles store 210 to facilitate the content curation system 200 to track the attributes of viewers.

A contributor account (corresponding to a contributor profile in the contributor profiles store 210) of the content curation system 200 can create a content board and curate (e.g., select from a storage system or the knowledge bank 208) content items to populate into the content board. The content curation system 200 can generate a content board based on a variety of attributes, such as the company the contributor works for, the contributor' position or title, an assigned business associate (e.g., a customer or a supplier), a calendar meeting, a browser history, a browser favorites, a content creation date, other content related metadata, other contributor related metadata, follower/subscriber related metadata, viewer related metadata, or any combination thereof.

Content Curation Interface

The content curation system 200 can provide a set of tools to enable the users to interact with the curated content from within the content curation system 200 and thus creating a comprehensive experience. The content curation interface 202 can include multiple interactive components. For example, the content curation system 200 may include any combination of the following modules: a content navigation component 212, an analytics viewport component 214, a content share button 216, a content subscription button 218, a content curation panel 220, an annotation component 222 (e.g., an interface to embed a note), a forum component 224, a parametric configuration interface 226, a metadata viewport 228, a content copy component 230, a contributor management panel 232, other interface components, or any combination thereof. Other examples of interactive components of the content curation interface 202 include an interface to tag content items or boards to create a grouping that is searchable; an interface to search for content items or boards, and a recommendation panel to present related recommended content from or available to the content curation system 200.

The content navigation component 212 facilitates content navigation. The content navigation component 212 can be coupled to a mobile or web application that provides an interface for the user to view the curated content within the application. The content navigation component 212 can also be coupled to a presentation mode viewer, which is a client-side application that presents content items and boards in the presentation mode. In some embodiments, content items/boards may be presented for a group of people in automatic slides. The presentation mode viewer can provide an interface to automatically layout the content items/boards for presentation to the group of people. The content navigation component 212 can store/cache the content items/boards offline as well. For example, the content navigation component 212 provides an interface to flag content boards/items in the content curation interface and cause a client device (e.g., a mobile device or a computer) to download the flagged content boards/items such that they are available for offline viewing. For example, the flagged content can be cached on a mobile device or a browser cache.

The annotation component 222 provides an interface for a user to annotate part of a content item/document and share the annotated parts with or without the associated content. The content curation panel 220 facilitates users to curate content from a variety of sources, both internal and external. For example, the content curation panel 220 may be coupled to the API integration module 206 and the knowledge bank 208 to provide source content for the user to select. The analytics viewport component 214 facilitates user devices to present analytics computed by the content analytics module 204 Likewise, the metadata viewport 228 facilitates user devices to present metadata of a content item or a content board. The forum component 224 facilitates user devices to provide an interface to capture comments users (e.g., contributors) have for a content item or a content board. The content copy component 230 facilitates user devices to provide an interface for users to copy a content item or a content board, including editing the content item or the content board before publishing the new copy. The contributor management panel 232 facilitates user devices to provide an interface to manage which contributor accounts are associated with which content items or content boards. The contributor management panel 232 can also facilitate the user devices to provide an interface to manage permission and confidentiality settings associated with contributor accounts and with content items/boards.

Following and Shared Content Boards

The content curation system 200 provides a capability for users in the system to follow content boards of other users in the same community or, in some embodiments, across communities. For example, the users can follow content boards via the content subscription button 218. Users that decide to follow a content board of other users can view any content item in the content board and are dynamically notified when there is any update to the content board. A contributor account can share a content item/board with another via the content share button 216. Shared content boards are created to allow multiple users that are members of the same community to jointly share privileges to co-curate content into the content boards. These functionalities enable joint ideation and learning within an enterprise community.

The content curation system 200 supports external facing content items and boards. The content curation system 200 advantageously connect companies (e.g., across departments, enterprises and industries) or individuals from different companies and provide a joint business context reflected in content boards that can summarize multiple content from multiple storage systems. This system enables the building block to create a network of business connections between companies and to salvage important business context using content-centric management. For example, the content curation system 200 can facilitate interactions between or amongst employees, contractors, customers, channels, subscriptions, industry forums, business partners, other stakeholders, or any combination thereof. Users in the content curation system 200 may have a profile that would enable them to participate in multiple communities and interact with multiple parties.

Relevancy Management

To assist contributor accounts in managing content easily, the content curation system 200 can provide a relevancy service via a relevancy module 242 in the content analytics module 204. This service can discover the most relevant content items on content boards for users based on multiple signals, such as recency, amount of user's activity, overall community activity, contributor profile, contributor position, contributor reputation, other contributor metadata, other content metadata, other data or metadata used in generating a content board, or any combination thereof. External signals may also be used to calculate the relevancy score of a content item or content board. For example, relevancy can be calculated from extracted metadata from calendar applications, messaging or communication applications, customer relationship management systems, or any combination thereof. The relevancy service may be applied in various applications of the content curation system 200. For example, the relevancy scoring may be used in sorting items for users by relevancy, highlighting most relevant portions of a content item or a content board, recommending items to similar users/content requesters, or archiving most irrelevant items.

Content Recommendations

A core element of the content curation system 200 is a recommendation engine, such as the content recommendation engine 246, which allows users to discover new content that has been curated by co-workers or other members of their community that is relevant for their area interest and work. The technique for obtaining the recommended items, when determining which content to recommend, can consider content (e.g., content with high relevancy score) selected by users (e.g., specific user types, profile, or reputation score), content selected by other users in the community, correlation function between users in the community, correlation between content items and usage scenarios, such as popularity, recency, trending over time, or any combination thereof. The content recommendation engine 246 can be leveraged to identify content relevancy or be used to facilitate discovery of content between users.

The content recommendation engine 246 can further take into account content, user profiles, metadata related to the content or the user profiles, or any combination thereof, from one or more external systems. In some embodiments, the content recommendation engine 246 can perform textual analysis (e.g., based on natural language parsing) to determine associations between users and contents, including identifying business context of the contents, and business goals of the users. In some embodiments, the content recommendation engine 246 can compute business impact associated with content items and content boards and make recommendation based on the business impact. Business impact may be based on activities and interactions with the content and/or other information from textual analysis or an external system (e.g., revenue of a department, team, or a project associated with the content). In one example, the content recommendation module 246 can recommend a content board that has the highest probability to close a business deal.

Recommended content items or boards can be selected specific for each user. Recommended content may also be selected for each specific content board or specific content item (e.g., related items). Recommended content may also be based on both specific user and specific content item or board, such as for a specific content board or item a specific user is viewing, following, curating, annotating, other interacting, or any combination thereof.

This usage of recommendation system has been discovered to be unique. The recommendation selection technique is based on natural language parsing, collaborative filtering, additional techniques for media delivery or preference matching, or any combination thereof.

Impact Analytics

The content curation system 200 supports curation of content for personal use, such as through the impact analysis engine 244. For example, the content curation system 200 can be used to share content with other people in the community. As such, users that publish content may want to build their reputation. With the impact analytics, people that share content can analyze the use and following patterns of the content they shared. Hence, the content curation system 200 can calculate the impact analytics to provide users with a crowd-based analysis of their organizational impact. The reputational scores of the impact analytics may be used for other purposes in the enterprise organization.

Examples of variables used to calculate the impact analytics for a unit of content (e.g., a content item/board) include at least: number of views, number of viewers and/or contributors, reputations (e.g., impact scores) of viewers or contributors of the content, number of re-selections, distributional reach to a quantified number of organizational units, trending of usage overtime, benchmark against other influencers, geographical distribution, distribution by organizational structure (headquarters, branches, subsidiaries, clients, etc.), other metadata of viewers, followers, or curators of the content, or any combination thereof. The impact analysis of a contributor account may include the aggregate impact score of the impact scores of content items and content boards associated with the contributor account. The benefit of the impact analytics is the ability to significantly improve organizational alignment, employee recognition and satisfaction, and most importantly to drive business results.

Dynamic System Discovery and Cross System Navigation

The API integration module 206 manages interactions between the content curation system 200 and any external systems, such as external content storage systems, external directory of enterprise contributor profiles and accounts, external content analytics systems, external social networks, or any combination thereof. The API integration module 206 can authenticate contributor profiles, automatically fill in contributor profiles, reference content, store content, or cross-reference activities in a social network or a message network profile with the knowledge bank 208 and the contributor profiles store 210.

Integration can be bi-directional integration, where operations that take place in the content curation system 200 can also be manifested in the external system. For example, content items can be created in the content curation system 200 and stored in the external system of which is integrated with the content curation system 200 through the API integration module 206. The vice versa can also occur, such as adding a content item from an external collaboration system and the associated metadata to the knowledge bank 208 for the content curation system 200.

To support external systems through integration, a contributor account can define a parametric configuration through the parametric configuration interface 226 for each type of content and each type of external system. The users of the content curation system 200 can "train" the content curation system 200 to extend support for unsupported external systems by defining the parameters for the "unknown" external system.

Figure 15:
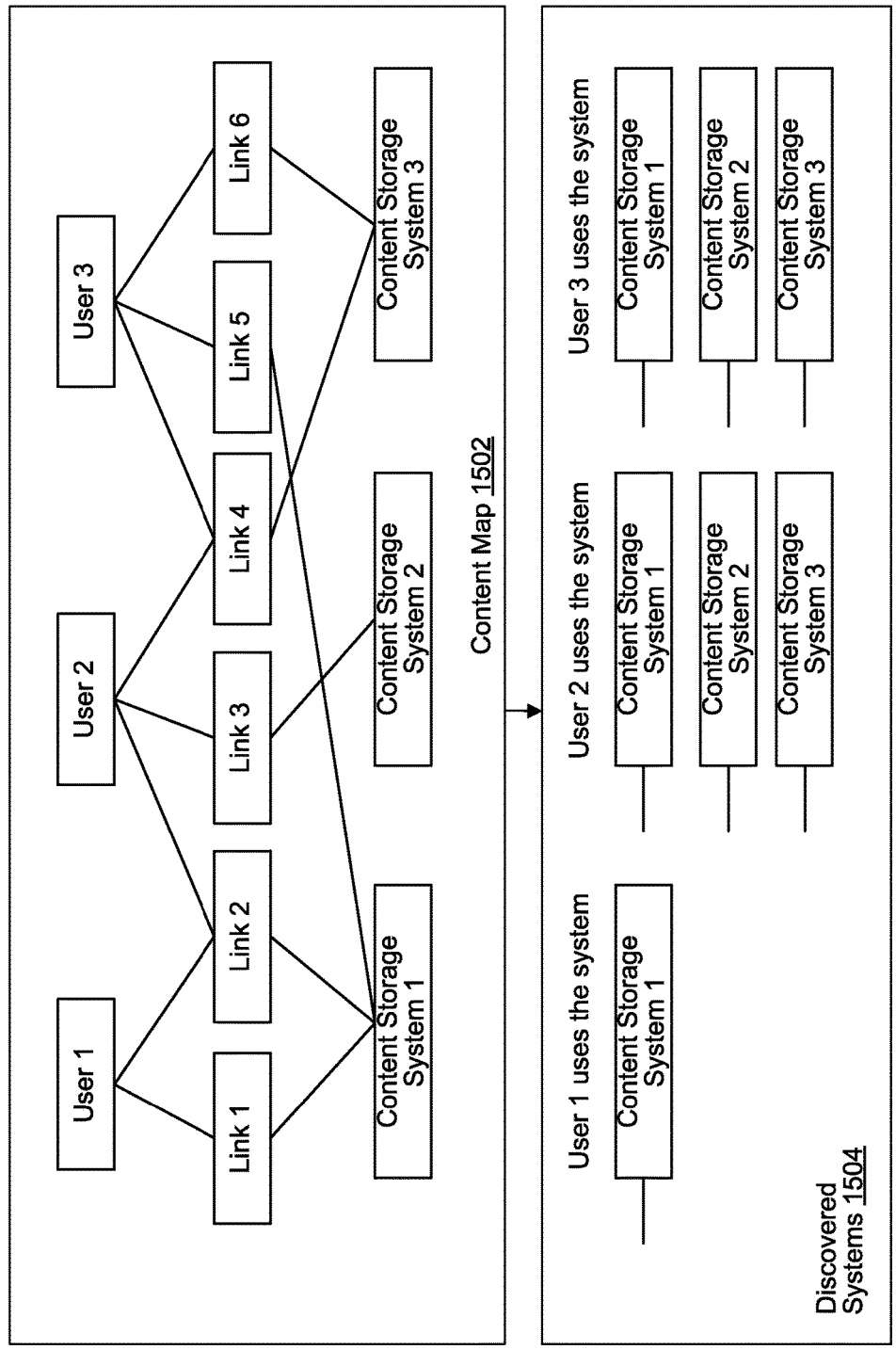
FIG. 15 is an illustration of a process of system taxonomy crowd sourcing, in accordance with various embodiments.

For example, the content curation system 200 can discover individual content source systems as the users of the content curation system 200 start curating content from those content source systems. Using cross correlation and analysis between content items/boards curated by different users, the content curation system 200 can dynamically build a taxonomy of content source systems (internal or external). Another way to explain this is as system taxonomy crowd sourcing (see FIG. 15). FIG. 15 is an illustration of a process of system taxonomy crowd sourcing, in accordance with various embodiments. The content curation system 200 can traverse through a content map 1502 (e.g., a map of associations between curated content links and contributor accounts/users) to discover the underlying storage systems (e.g., the discovered systems 1504) storing the content items and boards referenced by the curated content links. Once the system taxonomy is available, actions such as search, navigation through content, content capturing, integration, or any combination thereof, can be implemented. The result is an enhanced content discovery allowing users rapid access to most relevant content.

The modules described within may be implemented as hardware components, software modules, or any combination thereof. For example, the modules described can be software modules implemented as instructions on a tangible storage memory capable of being executed by a processor or a controller on a machine. The tangible storage memory may be non-transitory. Software modules may be operable when executed by a processor or other computing device, such as the computer system 500, a mobile phone, a network capable computing device, a virtual machine, a cloud-based computing platform, or any combination thereof.

Each of the modules may operate individually and independently of other modules. Some or all of the modules may be executed on the same host device or on separate devices. The separate devices can be coupled via a communication module to coordinate its operations. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. The content curation system 200 may include additional, fewer, or different modules for various applications.

Content sharing using the content curation system 300 can occur various scenarios. Example use cases can include sales communication (e.g., content sharing between a sales team and a prospect customer), sales enablement (e.g., content sharing between marketing department and sales department, such as content ordered by topic, industry, or focus area), content campaigning (e.g., content sharing from marketing or sales departments and openly to all potential prospects), designer boards (e.g., content sharing between design department/contributor and customer prospects for the purpose of aligning on a certain visual tone), group content curation (e.g., curating content for the purpose of joint research or ideation regarding a topic), event content pack (e.g., content sharing between presenters at an event and audience members for pre-event distribution or post-event follow-up), partner/channel enablement (e.g., content sharing between partners or sales channels and a company for the purpose of familiarizing the internal team to the partners or channels), training (e.g., between senior professionals and trainees), embedded content (e.g., content provided as an embedded element in a website that could be updated dynamically and presented as a widget), account management (e.g., content sharing between accounts team and their customers in regards to account information for relationship building and up-selling), public boards (e.g., content shared in the public domain for building public expertise recognition and crowd sourcing knowledge extraction), customer content management (e.g., content exchange between a customer and a company, as part of the service or product provided the company), knowledge base (e.g., collecting "know how" for the purpose building a knowledge sharing platform), and project preparation (e.g., curation of content related to specific project deliverables, such as a marketing launch or a product taping out). Other use case patterns may include gathering, analyzing, and collaborating between individual and/or teams of professionals and distributing, sharing, and discovering content and data between individual and/or teams of the professionals. For example, the first pattern may involve reference materials for deliverables (e.g., a launch or a release), ad-hoc decisions and tasks (e.g., competitive response, customer case, technical decision, recruiting, or sourcing), or on-going tracking (e.g., market tracking, customer tracking, industry best or practice tracking). The latter pattern may involve sales enablement, customer communication, and knowledge base building as previously discussed.

Figure 3:
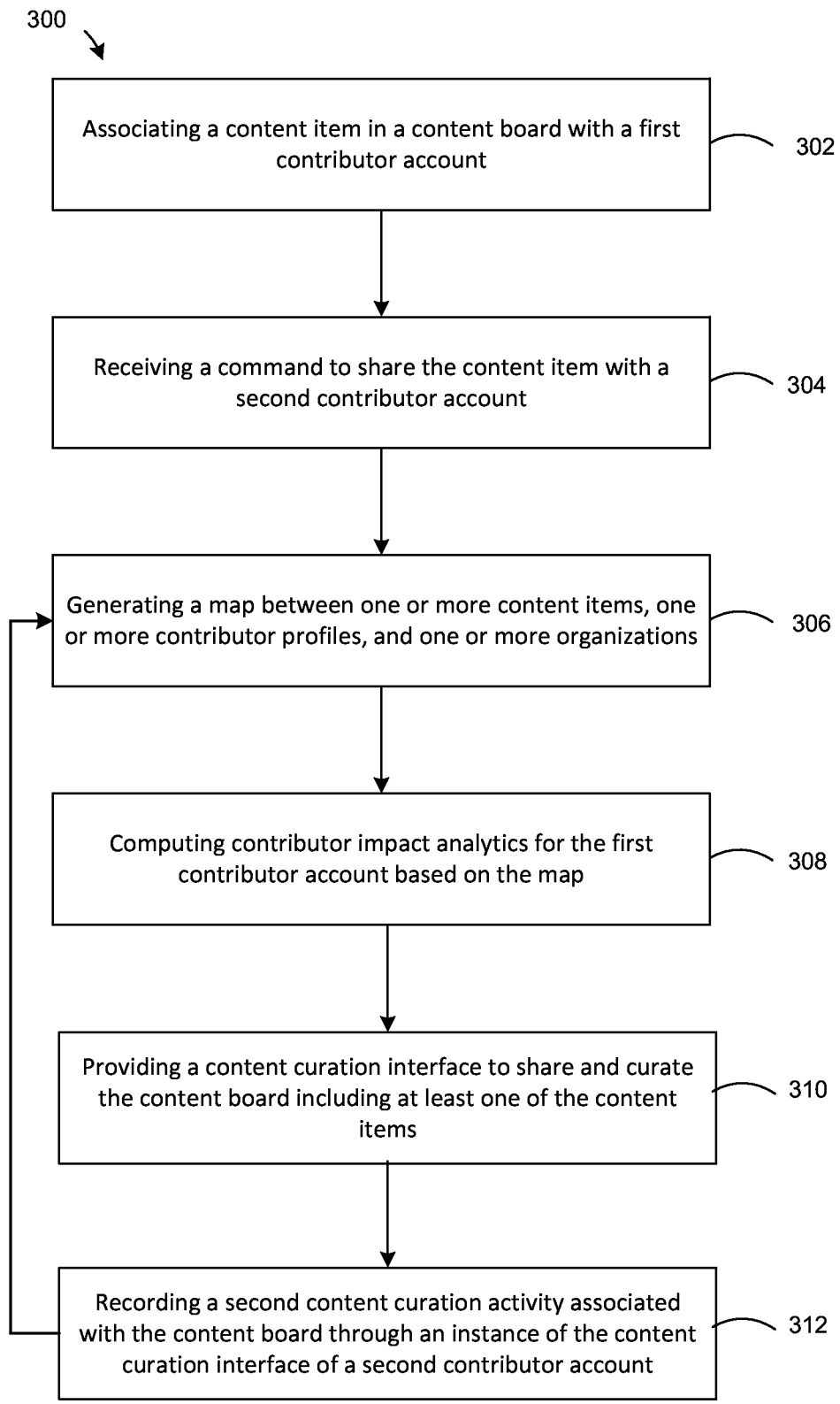
FIG. 3 is a flow chart of a method for tracking content impact in a content curation system, in accordance with various embodiments.

FIG. 3 is a flow chart of a method 300 for tracking content impact in a content curation system (e.g., the content curation system 102 of FIG. 1 or the content curation system 200 of FIG. 2), in accordance with various embodiments. The method 300 includes step 302 of the content curation system associating a content item in a content board with a first contributor account. For example, the association can be based on a first content curation activity initiated by the first contributor account. At step 304, the content curation system receives a command to share the content item with a second contributor account.

At step 306, the content curation system generates a map between one or more content items, one or more contributor profiles, and one or more organizations. The map indicates how the content items are shared amongst the organizations and the contributor profiles. For example, generating the map includes associating the content board (e.g., including multiple content items) with the first contributor account and a first organization. The organizations can be one or more departments inside an enterprise, one or more enterprises, or a combination thereof. Generating the map can include tracking a path of how the content board is shared through the map.

Generating the map can include associating at least one of the contributor profiles with at least one of the organizations by accessing a company directory via a lightweight directory access protocol (LDAP). Generating the map can also include populating profile attributes of at least one of the contributor profiles by accessing a social network account associated with the contributor profiles (e.g., LinkedIn™). Generating the map can further include maintaining the content's familial relationships (e.g., between content items or boards originated from a source content item/board via a complete or partial copying of the source content item/board). For example, a source content item can have one or more child derivative content items, one or more grandchild derivative content items, and so forth. For another example, sibling relationships between child derivative content items are also maintained.

At step 308, the content curation system computes contributor impact analytics for the first contributor account based on the map. For example, computing the contributor impact analytics includes determining an interaction pattern of at least content access activities and content contribution activities of the contributor accounts associated with the content board and shared copies of the content board (e.g., derivative content).

In some embodiments, computing the contributor impact analytics includes computing the contributor impact analysis for a derivative content from one of the content items associated with the first contributor account. For example, a first content item may be associated with the first contributor account. A second content item that is created by copying the first content item may be considered a derivative content of the first content item, even if the second content item is edited later on.

Computing the contributor impact analytics can include computing an impact score. The impact score can be calculated by tallying how many unique people have viewed the content board and access activities of a specific type (e.g., viewing, editing, commenting, rating, recommending, sharing, following, copying, or any combination thereof) to the content board. The impact score can be based on one or more numbers of views of the content board or the content item, viewers (i.e., "reach" of the content board), contributors, relevancy approvals, recommendations, content shares, or any combination thereof. The impact score can also be based on content rating, content access frequency, content update frequency, update share frequency, or any combination thereof. In some embodiments, the impact score can be calculated based on financial data, including revenue, expenses, and assets that are directly or indirectly associated with the content board or content item. Higher revenue or profit can be used to compute a higher impact score. For example, indirect association includes where the financial data is associated with a contributor profile that is associated with the content. Computing the impact score can also include normalizing the impact score against impact scores of the group.

Computing the contributor impact analytics can also include recognizing a top contributor from amongst a group of contributor accounts in an enterprise organization based on the impact score of the top contributor. This is useful in incentivizing content contribution within the enterprise organization. For example, the content curation system can credit a reward incentive to the top contributor.

Computing the contributor impact analytics can further include computing a content relevancy score for the content board or the content item. The content relevancy score, for example, can be determined based on the first content contribution activity, the second content contribution activity, the content access activities to the content board or the content item of other user accounts in the content curation system, or any combination thereof.

At step 310, the content curation system provides a content curation interface to share and curate the content board including at least one of the content items. For example, the content curation interface can maintain the content board as a single unit for sharing. The content curation interface can further provide the contributor impact analytics for the contributor accounts (e.g., the first contributor account) that are associated with the content board. For example, the content curation interface can display the interaction pattern of contributor accounts associated with the content board.

Providing the content curation interface can include providing a link to at least one of the content items on the content curation interface via a web-based storage service, such as Dropbox, SharePoint, salesforce.com, or Box. Providing the content curation interface can include providing the contributor impact analytics of the derivative content, described above, through the content curation interface.

Providing the content curation interface can also include providing a representation of the path of how the content board is shared through the generated map. In some embodiments, the content curation interface only shows the path downstream from after the first contributor account became associated with the content board (i.e., not the path upstream before the first contributor account became associated with the content board). In some embodiments, the content curation system prevents an identity of a contributor profile involved in the path from being provided through the content curation interface based on a permission and confidentiality setting of the contributor profile. In some embodiments, if there is no permission to access a particular contributor profile, then data, metadata, and analytics associated the particular contributor profile become inaccessible as well. In some embodiments, the permission and confidentiality setting allows attributes and metadata related to the content item and the content board to be collected but anonymized (i.e., shown without revealing which contributor profile such attributes and metadata are associated with).

A user account of the content curation system, such as a contributor account, can access the content curation interface through a website link. For example, another user account can provide the website link to this user account to reference the content board. The website link can include a cryptographic key as a parameter to access the content curation interface configured specifically for the content board. The content curation system can authenticate the user account using the cryptographic key, and grant access to the content curation interface for the content board.

The content curation interface configured for the content board may be associated with an email inbox. The content curation system can maintain an email inbox associated with an email address to receive attached content items in an email destined to be part of the content board.

At step 312, the content curation system records a second content curation activity associated with the content board through an instance of the content curation interface of a second contributor account. In some embodiments, the first contributor account is associated with a first enterprise company and the second contributor account is associated with a second enterprise company. Step 312 can include storing metadata from the second content contribution activity associated with the content item. In response to step 312, the content curation system can update the map by repeating step 306 and re-compute (e.g., by repeating step 308) the contributor impact analytics for the first contributor account based on the second content curation activity.

Figure 4:
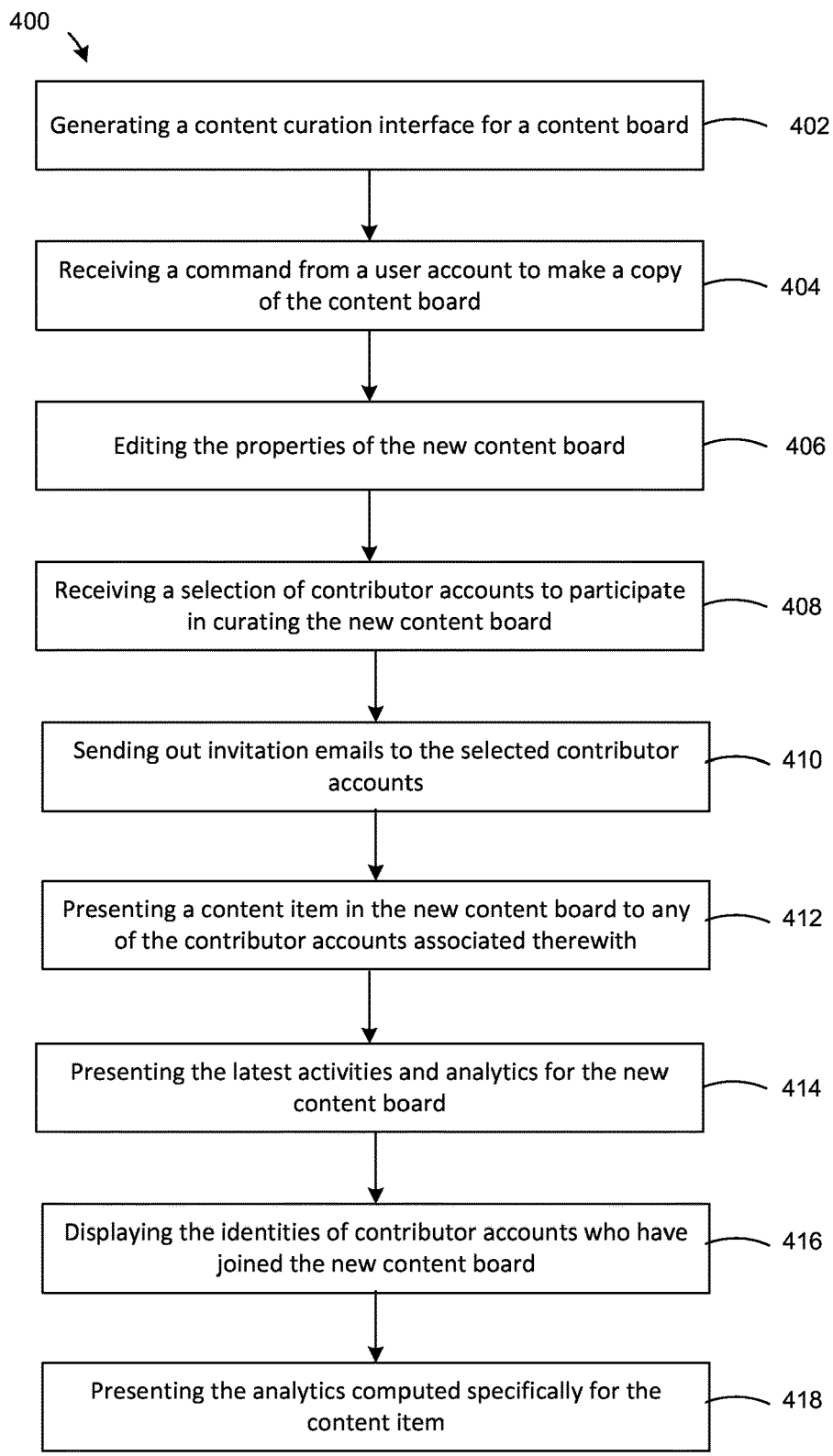
FIG. 4 is a flow chart of a method for sharing content via a content curation system, in accordance with various embodiments.
Figure 6:
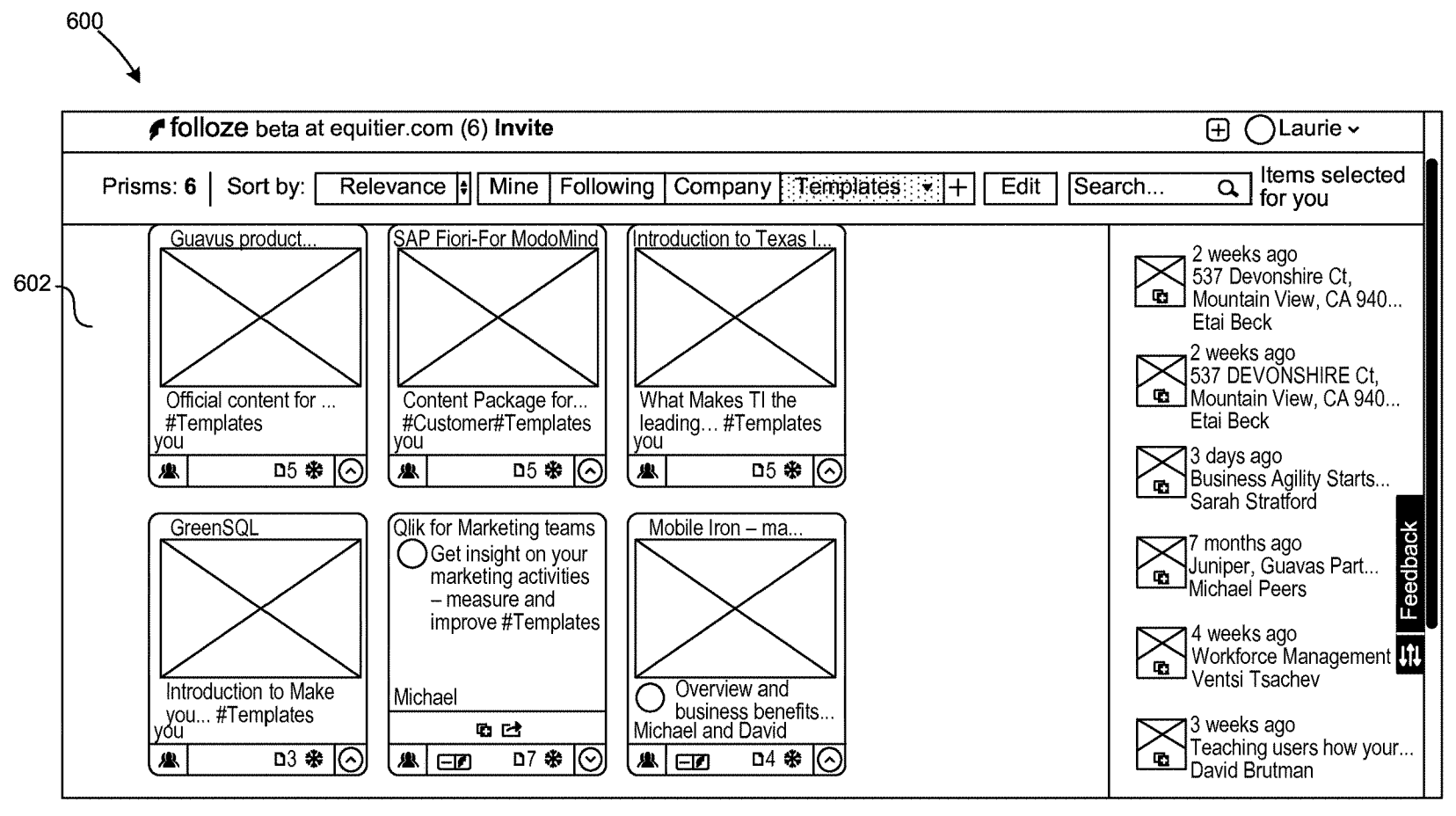
Figure 7:
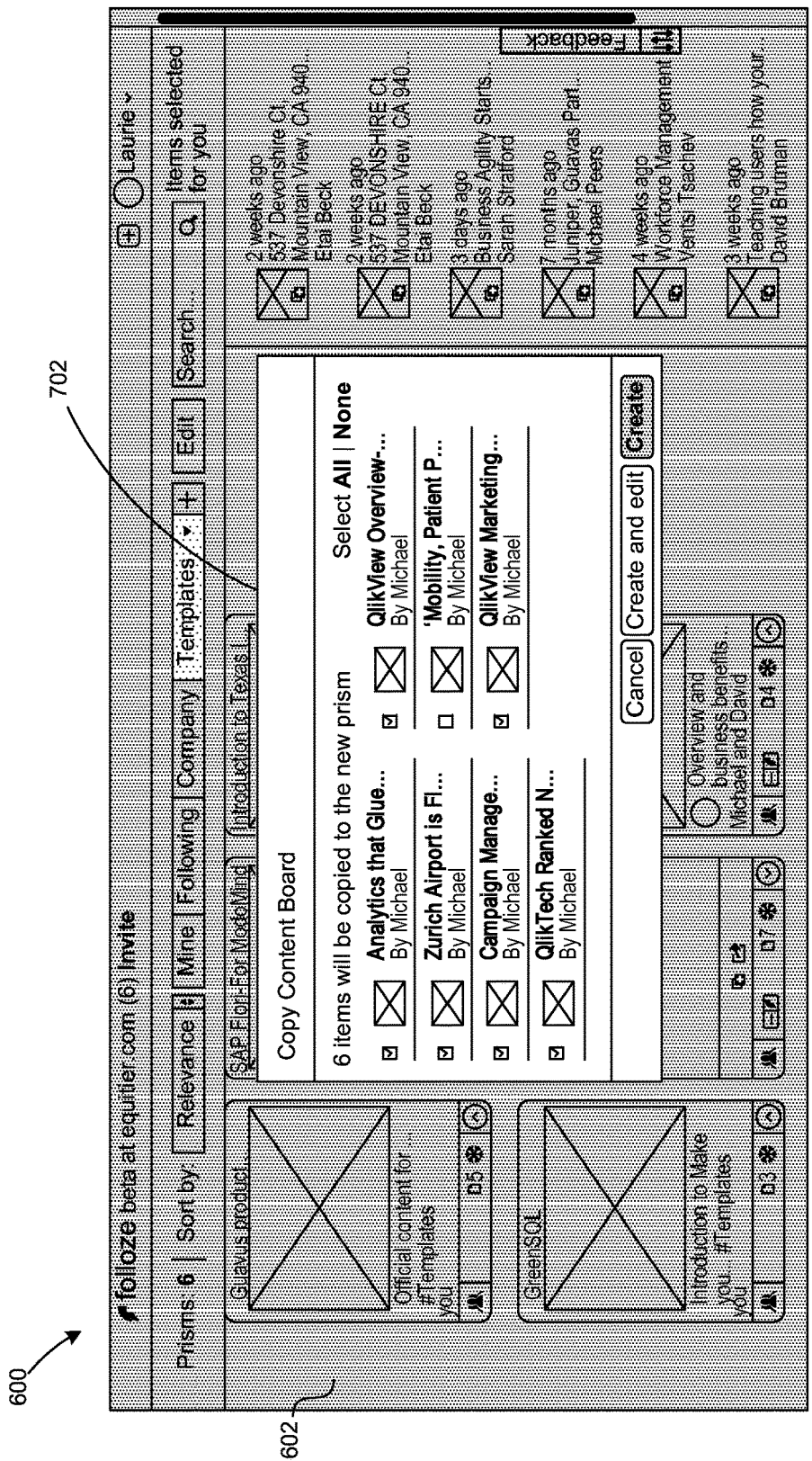
FIG. 7 is an example of a content copy panel to copy the content board to a new content board on the content curation interface of FIG. 6, in accordance with various embodiments.

FIG. 4 is a flow chart of a method 400 for sharing content via a content curation system (e.g., the content curation system 102 of FIG. 1 or the content curation system 200 of FIG. 2), in accordance with various embodiments. The method 400 begins with the content curation system generating a content curation interface for a content board at step 402. FIG. 6 is an example of a content curation interface 600 for a content board 602, in accordance with various embodiments. In this example, the content board 602 can be a content template. Then at step 404, the content curation system receives a command from a user account to make a copy of the content board 602. FIG. 7 is an example of a content copy panel 702 to copy the content board 602 to a new content board on the content curation interface, in accordance with various embodiments. The content copy panel 702 enables a contributor account associated with the content board 602 to select which of the content items to copy to the new content board 800. In some embodiments, when a source content is copied, the new copy is a reference to the same source content. This enables managing a master source content that can update all linked content items. In some embodiments, when a source content is copied, the source content is replicated (with or without a reference to the source content) into a new copy.

Figure 8:
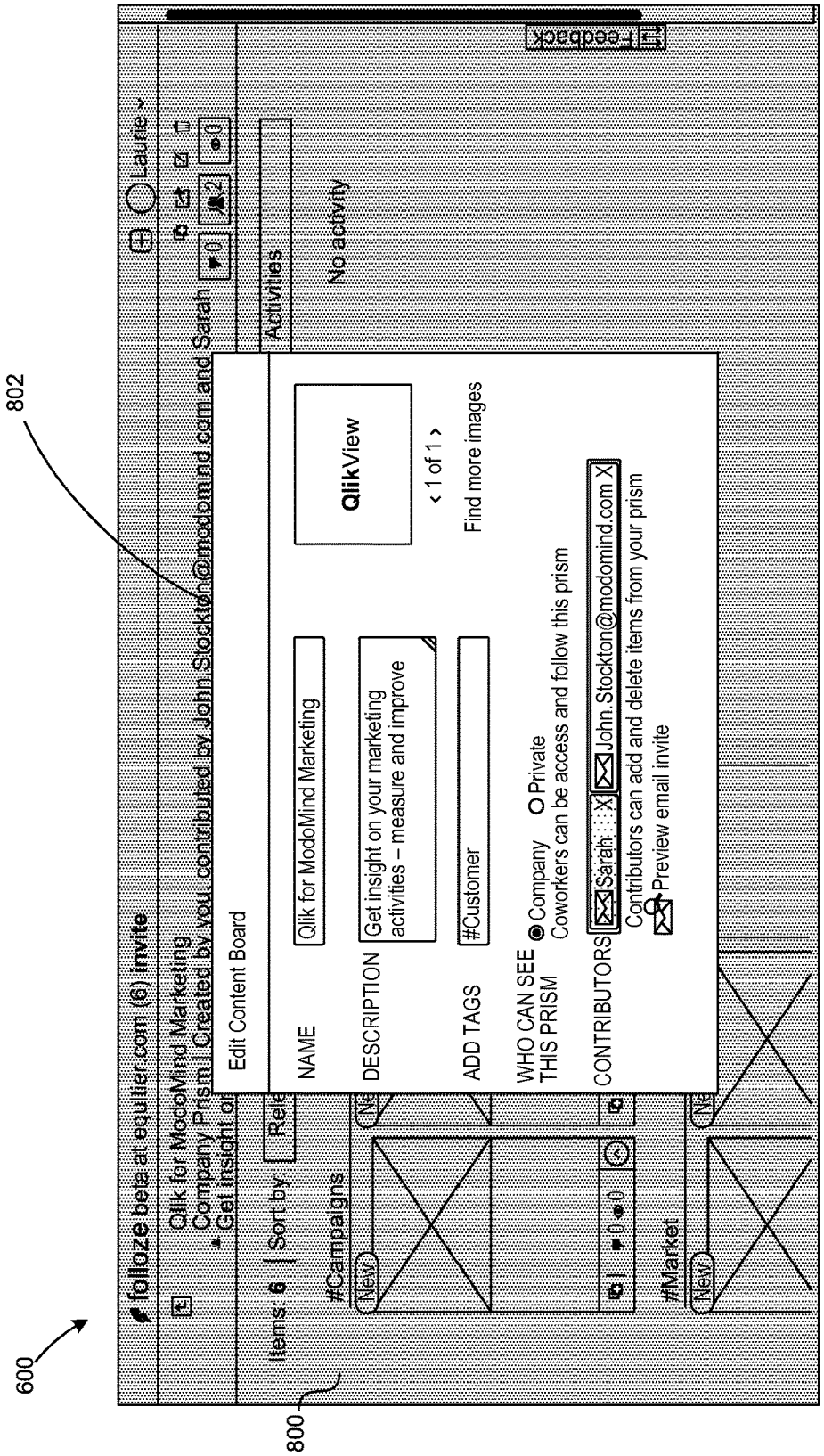
FIG. 8 is an example of an editor panel to edit the new content board on the content curation interface of FIG. 6, in accordance with various embodiments.

At step 406, the content curation system edits the properties of the new content board before or after publishing it. FIG. 8 is an example of an editor panel 802 to edit the new content board 800 on the content curation interface of FIG. 6, in accordance with various embodiments. Initially, the new content board 800 will be organized in the same way as the content board 602 except for the content items that are not selected via the content copy panel 702 or the edits made through the editor panel 802.

Figure 9:
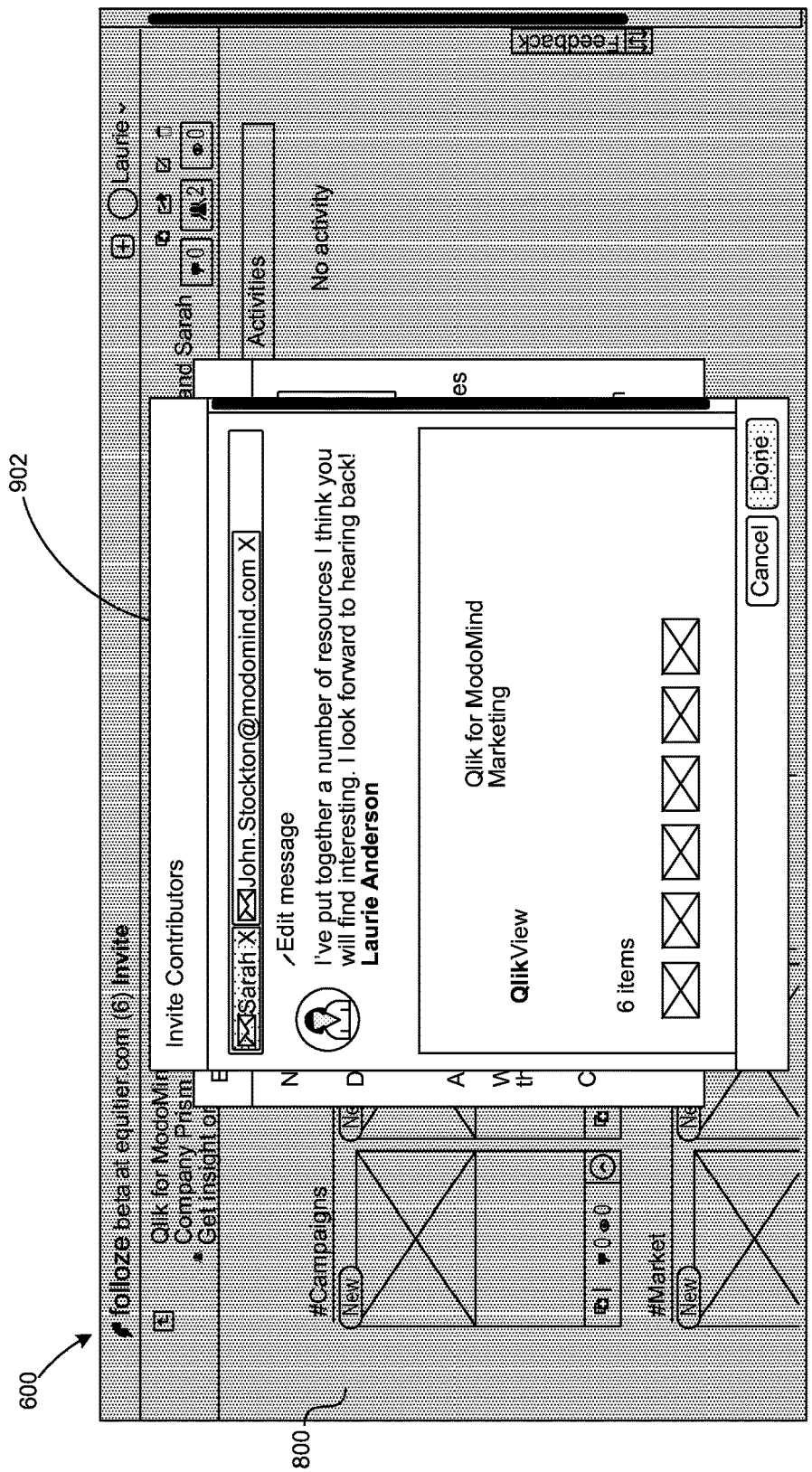
FIG. 9 is an example of a contributor management panel to invite contributor accounts to participate in curating the new content board on the content curation interface of FIG. 6, in accordance with various embodiments.

At step 408, the content curation system receives a selection of contributor accounts to participate in curating the new content board 800 from an existing contribution account. FIG. 9 is an example of a contributor management panel 902 to invite contributor accounts to participate in curating the new content board 800 on the content curation interface of FIG. 6, in accordance with various embodiments.

At step 410, the content curation system sends out invitation emails to the selected contributor accounts as indicated via the contributor management panel 902. FIG. 10 is an example of an email 1002 received by an invitee to participate in curating the new content board 800, in accordance with various embodiments.

Figure 11:
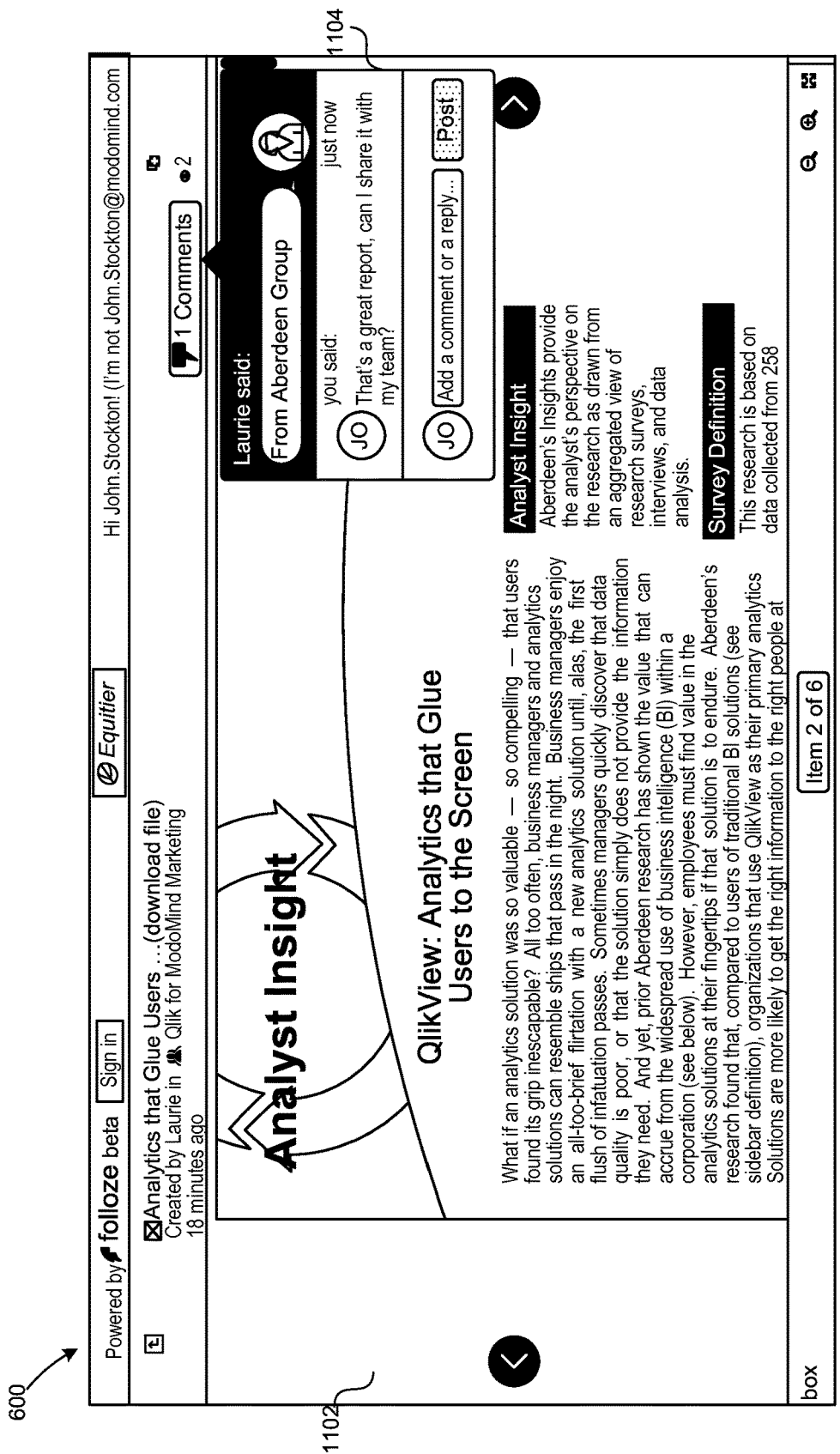
FIG. 11 is an example of the content curation interface of FIG. 6 presenting a content item in the new content board, in accordance with various embodiments.

At step 412, the content curation system can present a content item in the new content board 800 to any of the contributor accounts associated therewith. FIG. 11 is an example of the content curation interface of FIG. 6 presenting a content item 1102 in the new content board 800, in accordance with various embodiments. FIG. 11 further illustrates a forum panel 1104 for contributors and viewers to comment on the content item 1102.

Figure 12:
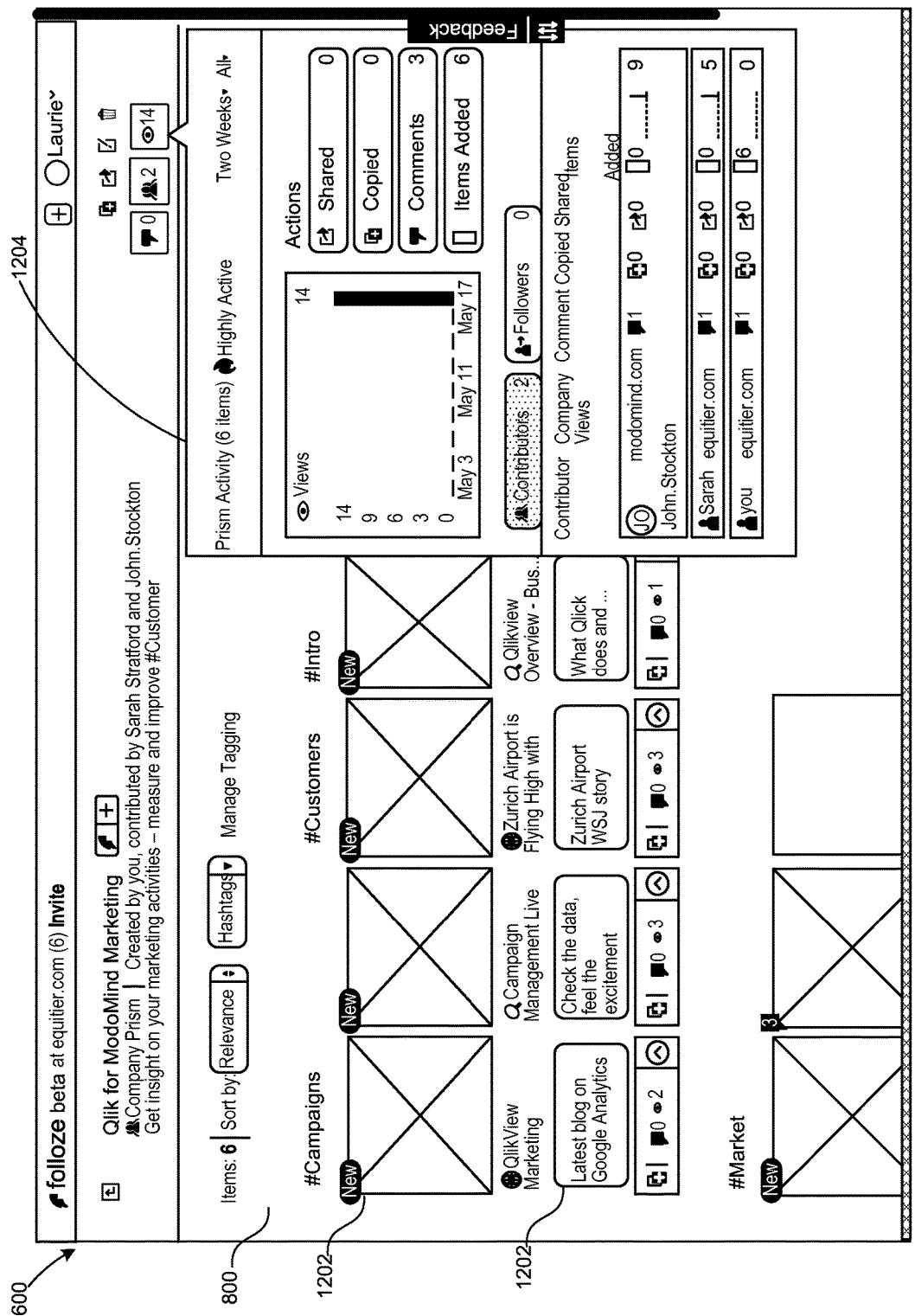
FIG. 12 is an example of the content curation interface of FIG. 6 illustrating latest activity labels and analytics in the new content board, in accordance with various embodiments.

At step 414, the content curation system can present the latest activities and analytics for the new content board 800. FIG. 12 is an example of the content curation interface of FIG. 6 illustrating latest activity labels 1202 and analytics 1204 in the new content board 800, in accordance with various embodiments.

Figure 13:
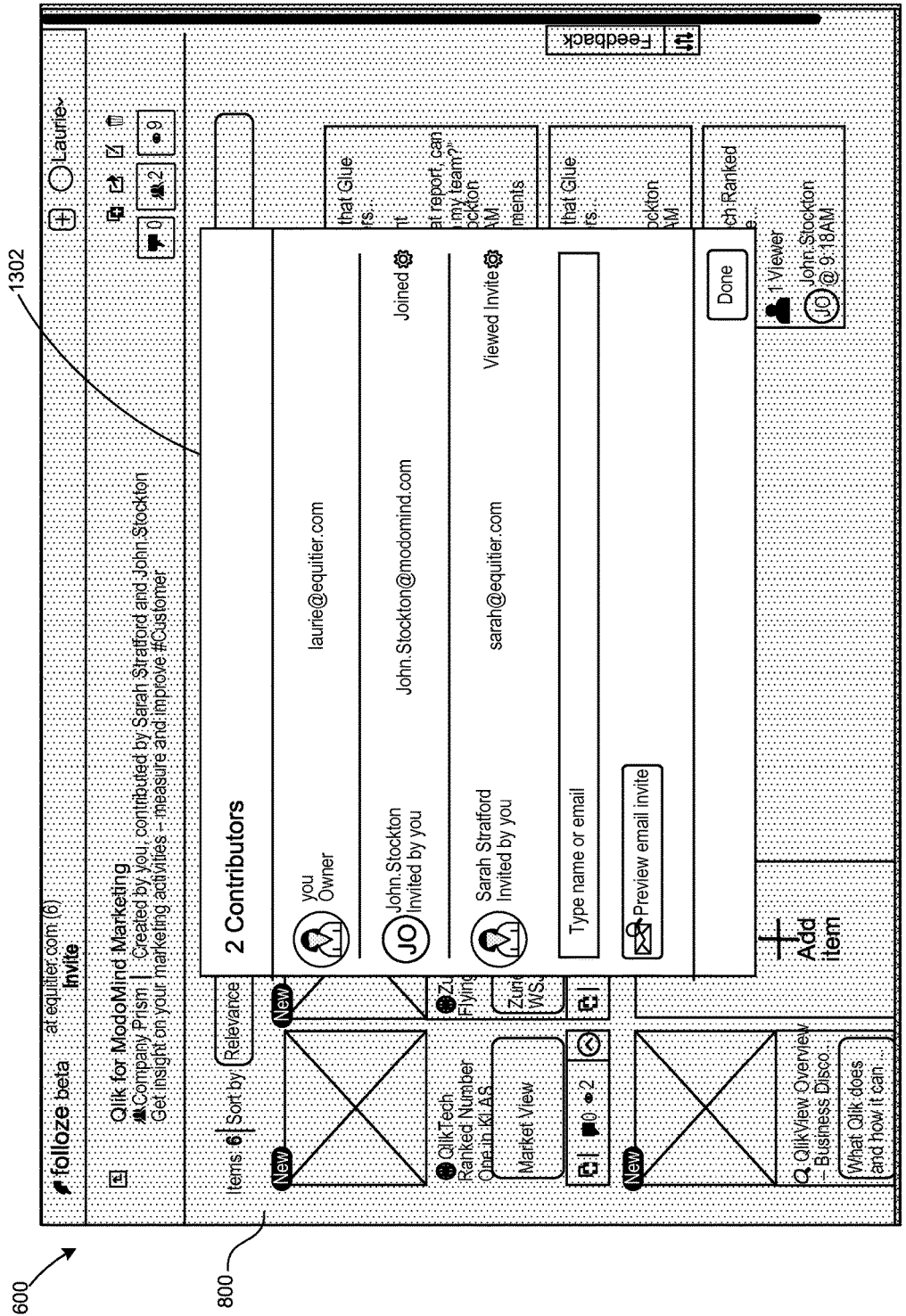
FIG. 13 is an example of the content curation interface of FIG. 6 illustrating a contributor-tracking panel for the new content board, in accordance with various embodiments.

At step 416, the content curation system displays the identities of contributor accounts who have joined the new content board 800. FIG. 13 is an example of the content curation interface of FIG. 6 illustrating a contributor-tracking panel 1302 for the new content board 800, in accordance with various embodiments.

Figure 14:
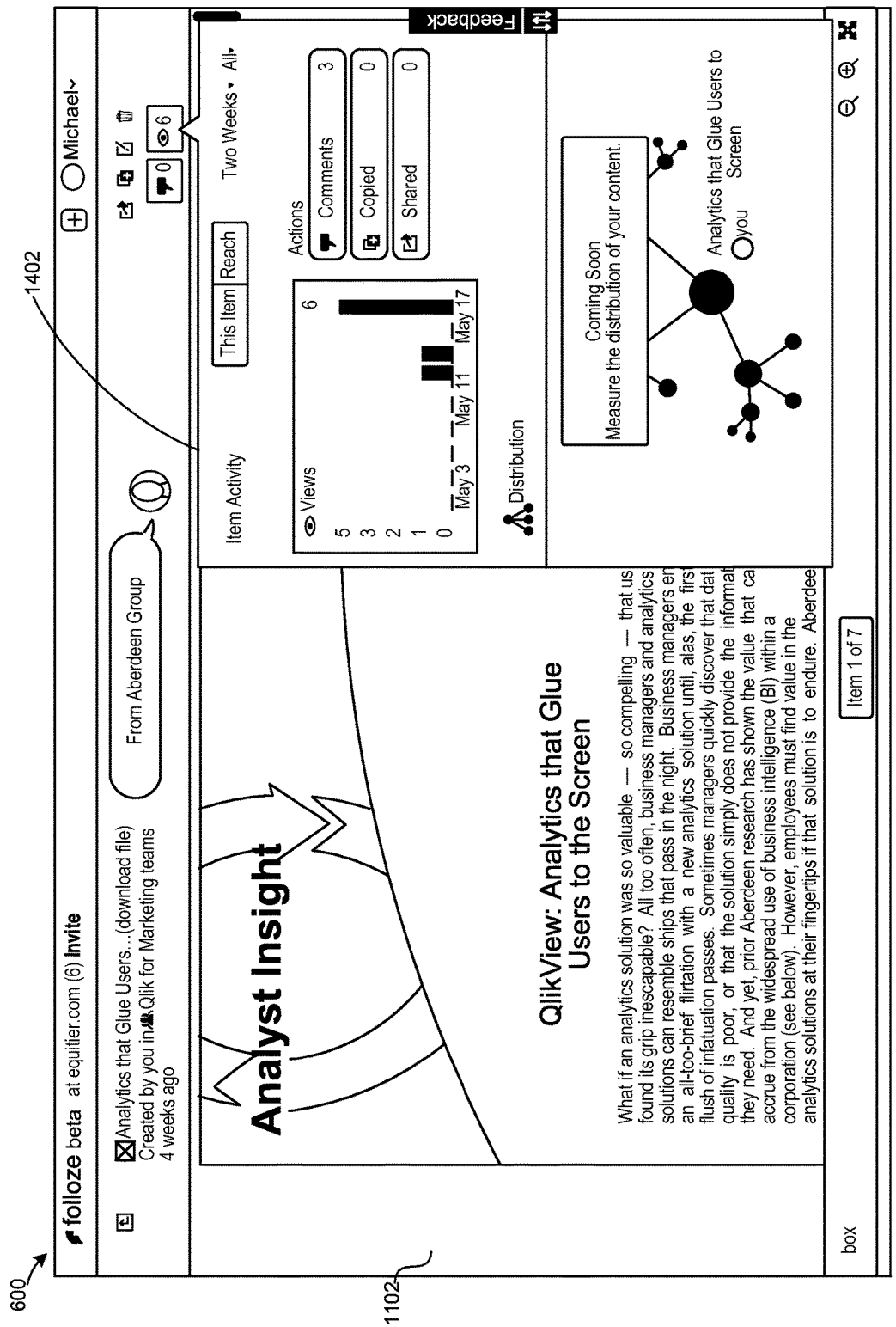
FIG. 14 is an example of the content curation interface of FIG. 6 illustrating the analytics for the content item shown in FIG. 11, in accordance with various embodiments.

At step 418, the content curation system present the analytics computed specifically for the content item 1102. FIG. 14 is an example of the content curation interface of FIG. 6 illustrating an analytics panel 1402 for the content item shown in FIG. 11, in accordance with various embodiments.

Figure 5:
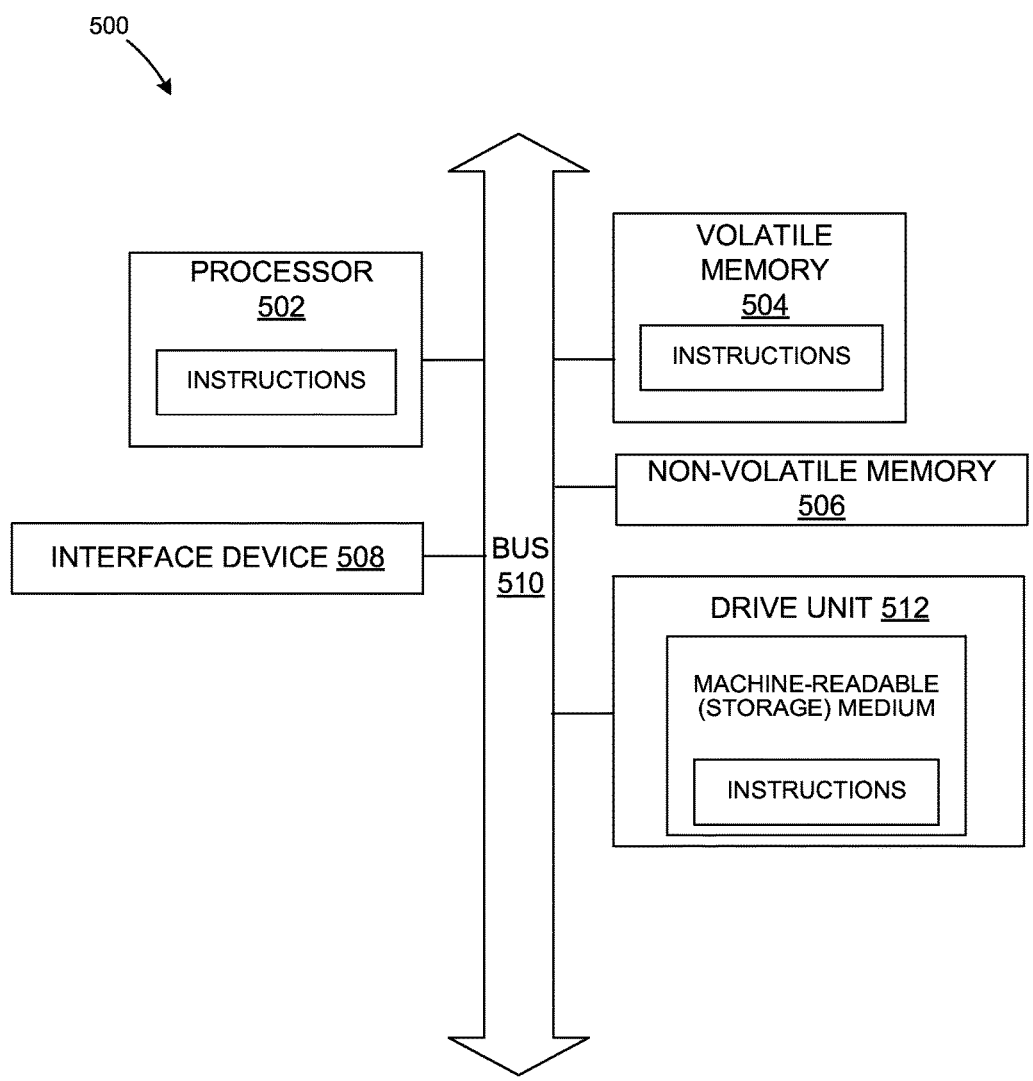
FIG. 5 is a diagrammatic representation of a machine in the example form of a computer system within which a set of instructions, for causing the machine to perform any one or more of the methodologies or modules discussed herein, may be executed.

While processes or blocks are presented in a given order in FIGS. 4-5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

FIG. 5 is a diagrammatic representation of a machine in the example form of a computer system 500 within which a set of instructions, for causing the machine to perform any one or more of the methodologies or modules discussed herein, may be executed.

The computer system 500 includes a processor 502, volatile memory 504, non-volatile memory 506, and an interface device 508. Various common components (e.g., cache memory) are omitted for illustrative simplicity. The computer system 500 is intended to illustrate a hardware device on which any of the modules or components depicted in the example of FIG. 2 (and any other components described in this specification) can be implemented. The computer system 500 can be of any applicable known or convenient type. The components of the computer system 500 can be coupled together via a bus 510 or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, a virtual machine, a cloud computing platform, an interactive kiosk, a mainframe, a mobile device, a server, a field programmable gate array (FPGA), or a combination of two or more of these. Where appropriate, computer system 500 may include one or more computing devices; be unitary or distributed; span multiple locations; span multiple machines; or reside in a cloud, which may include one or more cloud components in one or more networks. Where appropriate, the one or more computing devices may perform without substantial spatial or temporal limitation one or more steps of one or more methods described or illustrated herein. As an example and not by way of limitation, the one or more computing devices may perform in real time or in batch mode one or more steps of one or more methods described or illustrated herein. The one or more computing devices may perform at different times or at different locations one or more steps of one or more methods described or illustrated herein, where appropriate.

The processor 502 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor 502.

The volatile memory 504 is coupled to the processor 502 by, for example, a bus 510. The volatile memory 504 can include, by way of example but not limitation, random access memory (RAM), such as dynamic RAM (DRAM) and static RAM (SRAM). The volatile memory 504 can be local, remote, or distributed.

The bus 510 also couples the processor 502 to the non-volatile memory 506 and drive unit 512. The non-volatile memory 506 is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 500. The non-volatile storage can be local, remote, or distributed. The non-volatile memory 506 is optional because systems can be created with all applicable data available in memory. A typical computer system will usually include at least a processor, memory, and a device (e.g., a bus) coupling the memory to the processor.

Software is typically stored in the non-volatile memory 506 and/or the drive unit 512. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor 502 will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 510 also couples the processor 502 to the interface device 508. The interface device 508 can include one or more of a modem or network interface. It will be appreciated that a modem or network interface can be considered to be part of the computer system 500. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface device 508.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 506 and/or drive unit 512 and causes the processor 502 to execute the various acts required by the operating system to input and output data and to store data in the memory, including storing files on the non-volatile memory 506 and/or drive unit 512.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

What is claimed is:

1. A method of operating a computer system to incentivize participation in enterprise-level knowledge management, comprising:

associating a content item in a content board with a contributor account;

generating, by a processor, a map between one or more content items, one or more contributor profiles corresponding to contributor accounts, and one or more organizations, the map indicating how the content items are shared amongst the organizations and the contributor profiles, wherein generating the map includes tracking a path of how the content board is shared through the map and associating at least one of the contributor profiles with at least one of the organizations by accessing a directory via a lightweight directory access protocol (LDAP);

calculating, by the processor, a contributor impact score for the contributor account based on the map, wherein the calculating the contributor impact score for the contributor account based on the map includes:

determining that a content item of the one or more content items was created by the contributor account, identifying a derivative content item of the one or more content items that is created by a second contributor account different than the contributor account, the derivative content item being an edited copy of the content item, the derivative content item identified based on the map, determining a change in frequency of editing of both of the content item and the derivative content item, determining a number of unique contributor accounts that have edited other content items related to the content board, and generating the contributor impact score based on the change in frequency of editing of both of the content item and the derivative content item, and based on the number of unique contributor accounts that have edited the other content items; and providing a content curation interface to share and curate the content board including the content item, wherein the content curation interface provides the contributor impact score for the contributor account associated with the content board, a representation of the path based on a permission and confidentiality setting of the contributor profile configured to prevent an identity of a contributor profile involved in the path from being provided through the content curation interface, provides a link to the content item on the content curation interface via a web-based storage service, and provides access to the content curation interface through a website link with a cryptographic key as a parameter to access the content curation interface for the content board.

2. The method of claim 1, wherein providing the content curation interface includes providing a contributor impact score of the derivative content through the content curation interface.

3. The method of claim 1, wherein generating the map includes associating the content board, including multiple content items, with the contributor account and a first organization; and wherein providing the content curation interface includes maintaining the content board as a single unit for sharing.

4. The method of claim 1, wherein providing the content curation interface includes maintaining an email inbox associated with an email address to receive an attached content item in an email, the attached content item destined to be part of the content board.

5. The method of claim 1, wherein calculating the contributor impact score includes tallying how many unique people have viewed the content board.

6. The method of claim 1, wherein calculating the contributor impact score includes tallying access activities of a specific type to the content board.

7. The method of claim 6, wherein the specific type is viewing, editing, commenting, rating, recommending, sharing, following, or copying the content item.

8. The method of claim 1, wherein generating the map includes populating a profile attribute of one of the contributor profiles by accessing a social network account associated with the contributor profile.

9. The method of claim 1, wherein generating the map includes maintaining a familial content relationship between content items originated from a source content item via a complete or partial copying of the source content item.

10. The method of claim 1, further comprising:
recording a content curation activity associated with the content board through an instance of the content curation interface of another contributor account; and
updating the contributor impact score for the contributor account based on the content curation activity.

11. A method, comprising:
determining that a content board includes a collection of content items, each of the content items provided by a corresponding contributor profile;
determining, by a processor, a map indicative of how the collection of content items are shared among the contributor profiles, wherein the map tracks a path of how the content board is shared through the map and associates at least one of the contributor profiles with at least one of a plurality of organizations by accessing a directory via a lightweight directory access protocol (LDAP);
calculating a contributor impact score for each of the content items of the collection of content items based on the map, the contributor impact indicative of how others interacted with the content item based on the determination of how the collection of content items are shared among the contributor profiles, calculating the contributor impact score including:
determining that a content item of the collection of content items is associated with a contributor profile related to generating the content item,
identifying a derivative content item of the collection of content items that is related to a second contributor profile different than the contributor profile, the derivative content item being an edited copy of the content item, the derivative content item identified based on the map,
determining a change in frequency of editing of both of the content item and the derivative content item,
determining a number of unique contributor accounts that have edited other content items related to the content board, and
generating the contributor impact score based on the change in frequency of editing of both of the content item and the derivative content item; and
sharing the content item through a content curation interface based on the contributor impact score, and based on the number of unique contributor accounts that have edited the other content items, wherein the content curation interface provides a representation of the path based on a permission and confidentiality setting of the contributor profile configured to prevent an identity of a contributor profile involved in the path from being provided through the content curation interface, provides a link to the content item on the content curation interface via a web-based storage service, and provides access to the content curation interface through a website link with a cryptographic key as a parameter to access the content board.

12. The method of claim 11, wherein the contributor impact score is based on a number of relevancy approvals, recommendations, content shares, content views, or any combination thereof.

13. The method of claim 11, wherein the contributor impact score is based on content rating, content access frequency, content update frequency, content share frequency, or any combination thereof.

14. An electronic device, comprising:
one or more processors; and
memory storing instructions, wherein the processor is configured to execute the instructions such that the processor and memory are configured to:
determine that a content board includes a collection of content items, each of the content items provided by a corresponding contributor profile;
determine a map indicative of how the collection of content items are shared among the contributor profiles, wherein the map tracks a path of how the content board is shared through the map and associates at least one of the contributor profiles with at least one of a plurality of organizations by accessing a directory via a lightweight directory access protocol (LDAP);
calculate a contributor impact score for each of the content items of the collection of content items based on the map, the contributor impact indicative of how others interacted with the content item based on the determination of how the collection of content items are shared among the contributor profiles, calculating the contributor impact score including:
determining that a content item of the collection of content items is associated with a contributor profile related to generating the content item,
identifying a derivative content item of the collection of content items that is related to a second contributor profile different than the contributor profile, the derivative content item being an edited copy of the content item, the derivative content item identified based on the map,
determining a change in frequency of editing of both of the content item and the derivative content item,
determining a number of unique contributor accounts that have edited other content items related to the content board, and
generating the contributor impact score based on the change in frequency of editing of both of the content item and the derivative content item; and
share the content item through a content curation interface based on the contributor impact score, and based on the number of unique contributor accounts that have edited the other content items, wherein the content curation interface provides a representation of the path based on a permission and confidentiality setting of the contributor profile configured to prevent an identity of a contributor profile involved in the path from being provided through the content curation interface, provides a link to the content item on the content curation interface via a web-based storage service, and provides access to the content curation interface through a website link with a cryptographic key as a parameter to access the content board.

* * * * *